M. A. POPKESS AND J. E. BLACK.
COMPOSITE ARTICLE AND PROCESS OF MAKING SAME.
APPLICATION FILED MAR. 19, 1917.
1,334,317.
Patented Mar. 23, 1920.
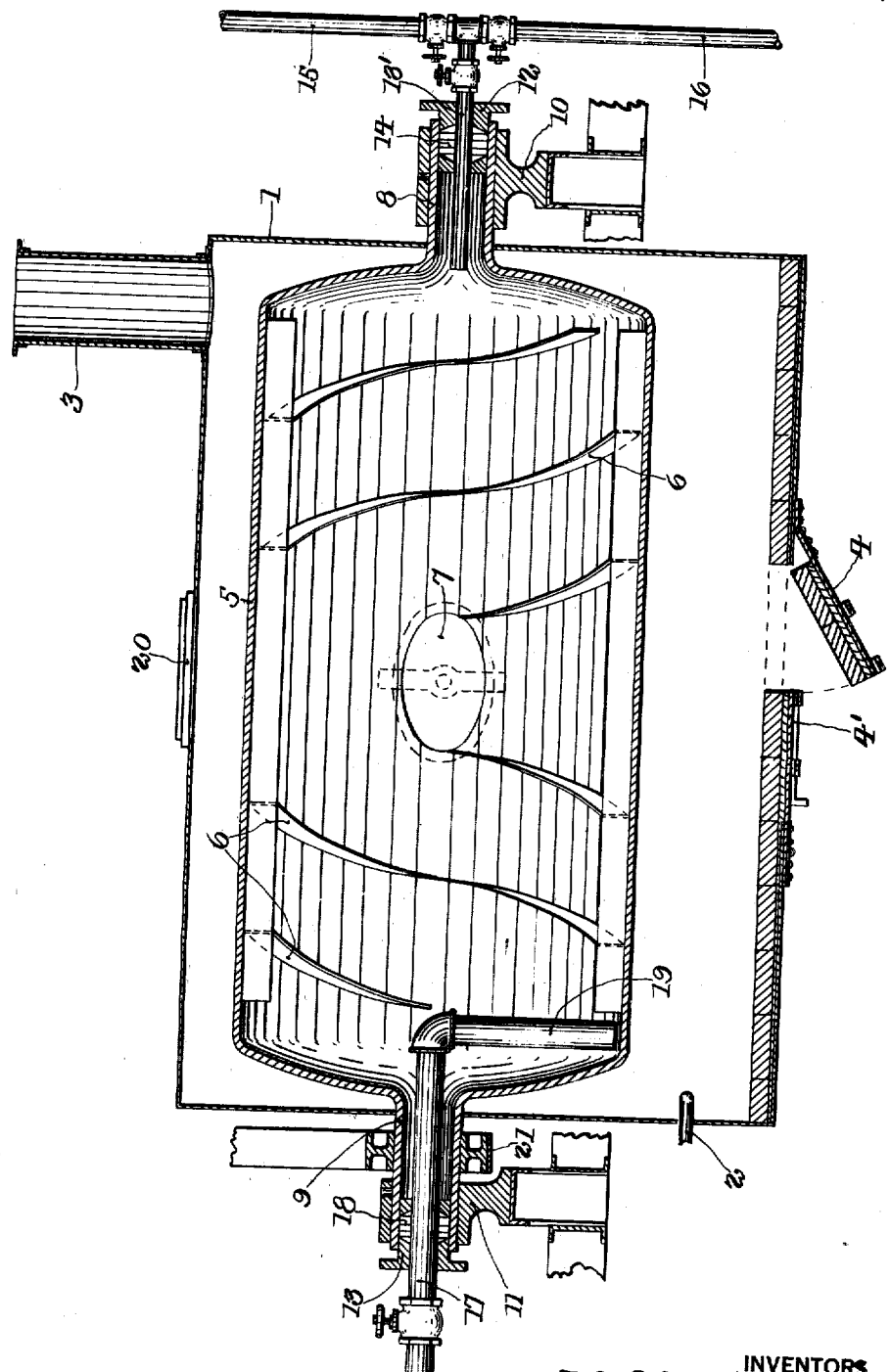
INVENTORS
J. E. Black and
M. A. Popkess
BY
W. P. McElroy
ATTORNEY

UNITED STATES PATENT OFFICE.

MICHAEL A. POPKESS AND JAMES EDGAR BLACK, OF KANSAS CITY, MISSOURI.

COMPOSITE ARTICLE AND PROCESS OF MAKING SAME.

1,334,317.  Specification of Letters Patent.  Patented Mar. 23, 1920.

Application filed March 19, 1917. Serial No. 155,837.

*To all whom it may concern:*

Be it known that we, MICHAEL A. POPKESS and JAMES EDGAR BLACK, citizens of the United States, and residents of Kansas City, in the county of Jackson and State of Missouri, have invented certain new and useful Improvements in Composite Articles and Processes of Making Same, of which the following is a specification.

This invention relates to composite articles and processes of making same; and it comprises a composite article composed of a binder or matrix and an aggregate or filler of asphalt-impregnated and waterproofed rocky material, usually limestone, said binder being advantageously also composed of the same type of material; and it further comprises a method of producing such articles wherein rocky or stony material is impregnated with asphalt or other bituminous or oily material with the aid of vacuum and pressure, the impregnated and waterproofed materials being afterward assembled and bound together to form shaped articles; and, more specifically, it also comprises a method of producing such article wherein a pervious textured rocky material, usually limestone, is crushed and all the material coming from the crusher is impregnated with asphalt with the aid of vacuum and pressure and is thereafter formed into the desired shape, the finer impregnated material serving as a binder or matrix for the coarser impregnated material; all as more fully hereinafter set forth and as claimed.

As is well known, limestone forms an excellent material for making roads of the macadam type. For this purpose it is better liked than other stony materials, either harder or softer, and, because of its slight solubility in water, it develops its own binder more quickly than most other substances. As a material for composite, built up structures, such as concrete, asphalt roadways, etc., it is not so good; partly because of its relative friability but mainly because it is not usually waterproof. It is, as stated, slightly soluble in water and it is also more or less pervious or porous. This porosity varies considerably in different limestones, some being of comparatively open texture while others are quite compact. But they are mostly pervious to a degree sufficient to permit entrance of water to some extent. This is very disadvantageous in making concrete, whether the cementing binder or matrix be Portland cement or asphalt. Other rocks are, of course, more or less pervious or porous; and any crushed rock is also fissured and cracked. Obviously if the aggregate, which ordinarily forms the greater part of the mass, is not waterproof it is not worth while trying to make the cementing medium so. Lack of appreciation of this fact is responsible for the non-success of the many propositions to waterproof ordinary concrete by various additions to the cement. As a matter of fact any sound cement with clean sand will give an impervious body and additions of foreign substances, such as oil, may be, and often are deleterious. Asphalt used as a binder is also usually sufficiently waterproof.

In the present invention we waterproof the coarser mineral matter used in the concrete, with the aid of asphalt or other material which will enter and seal the pores, crevices, cracks, fissures, etc. The waterproof material may then be used in making composite articles, such as road surfaces, blocks, bricks, walls, dams, etc., with the aid of any ordinary cementitious material, such as Portland cement or natural cement, asphaltic compositions, etc. The aggregate being waterproof it is easy to make the whole concrete waterproof.

In the case of limestone, the waterproofing with asphalt does not add to the hardness but it does considerably increase the density or compactness and the tensile strength and therefore tends to prevent breaking down in a roadway. Dust formation is practically precluded. Both in a roadway and in a wall shattering, by entrance of water and freezing, is prevented. Like results are of course secured with any other porous or pervious rock.

We find that the impregnation is best effected in a rather special way of using alternating vacuum and pressure although other ways may be employed; as by filling the pores of the rock with water and then heating it in melted asphalt; first steaming it and then treating with liquid asphalt, etc. In the best embodiment of our invention rocky fragments are exposed to as high a vacuum as can be readily produced to remove the air from the pores and are then treated with liquid asphalt, the entrance of the asphalt into the pores being facilitated by the use of pressure, which may be atmospheric or may be higher than atmospheric.

In the embodiment of our invention which is at present regarded as the best we place the rock in a rotating heated drum, although other apparatus may be employed, and then produce a vacuum. The rock may be heated before entering the drum. Under the influence of the vacuum and the heat the air leaves the pores and any water present is vaporized. Ordinarily, we next allow entrance of more or less hot liquid asphalt. The asphalt enters the pores and crevices of the material. Entrance may be facilitated by creating a pressure higher than the atmospheric pressure, after the admission of the asphalt, by means of dry steam under pressure. Rotation of the drum and mineral fragments is continued until the impregnation is perfected, impregnation being aided by the agitation caused by the rotation of the drum. The excess of asphalt, if any, is then drained off. The amount of asphalt admitted in this operation may be enough to cover the material and form a liquid bath or may be merely enough to cover the surfaces of the rock fragments. At the temperature employed in this stage of the operation draining to leave the rock fragments substantially dry is easily effected. The rocky fragments may now be removed from the drum and the impregnation of a new lot begun. Obviously, a stationary apparatus of the general nature of an autoclave or pressure pot may be employed, but the rotating drum is regarded as better since it permits agitation of the mixture during the impregnation.

The impregnated rock fragments may now be used in making a concrete with any suitable binder. They may for instance be assembled with an ordinary cement-sand mixture and converted into concrete; the fragments being used, if desired, in the usual graded sizes. The concrete may be used for walls in building, for blocks, for road surfacing, for dams, etc. Instead of using Portland cement any desired asphaltic composition may be used as a binder. We find however, where an asphaltic roadway is desired, it is better to use a special binder of the type described and claimed in the patent of one of us (No. 1008433—November 14, 1911) which consists in substance of an intimate and homogeneous mixture of fine clayey material and asphalt in such a proportion as to give a non-flowing mixture. The impregnated rock fragments may be assembled with this composition which is a plastic malleable material, the composition being used in such amount as to fill the voids, and the whole assemblage rammed, tamped or rolled into place as the surfacing of a roadway.

Instead of using impregnated crushed rock and the earth-bitumen binder separately prepared and assembled, the whole mass intended for the roadway may be treated at once. For example, with a natural soil containing rock fragments, shells, etc., the soil may be treated as it comes from the road, impregnation of the rocky fragments and impregnation of the clayey or earthy matter being simultaneously effected.

The impregnated limestone or other rock may however be used in other manners producing other advantageous types of pavement and concrete. For example, the binder or matrix for the impregnated rock fragments may be of exactly the same character as the rock fragments themselves and be produced at the same time. In this embodiment of our invention we crush limestone or other rock. The crushing of course produces fragments of a maximum size which may vary according to requirements and of all other sizes down to a very fine dust. All the material as it comes from the crusher ("run of crusher material") may be dumped into a drum and treated as hereinbefore described. This produces a mixture of rock fragments of all orders of sizes from the maximum size desired down to the finest material and all this mixture is impregnated in the manner described. After the impregnation is complete and the excess of asphalt is drained away, the material in the drum consists of waterproof fragments and dust of all orders of sizes, each particle being superficially filmed with a thin pellicle or skin of asphalt and having its interior crevices and pores impregnated with the same. At the temperature of the operation this asphalt is hot and very liquid, it being because of this liquidity that the surface coating is so thin. This hot mixture may be dumped on a roadway and tamped into place or it may be placed in molds and submitted to high pressure; even a pressure high enough to smash fragments into place and forcibly obviate voids. Of course instead of taking run of crusher material the material from the crusher may be graded in size according to the usual void filling specifications. But we regard it as better to take the run of crusher material.

In another embodiment of our invention a plastic malleable composition, well adapted for making roadways, may be produced by grinding limestone to a rather fine mesh, say 10 mesh, producing a powder which is tolerably uniform, impregnating this granulated material with asphalt in the manner described, the amount of asphalt used being such as will make from 11 to 19 per cent. of the final composition. The amount of asphalt necessary to give a firm, non-flowing yet malleable composition of course varies with the fineness of the material, its porosity, etc., and it is always our object to use just the amount which will give such a product. Ordinarily with fine grained material this amount will vary between 12 and 18 per cent. of the finished material. On cooling this composition gives a granular material which can be tamped, stamped, rammed, or rolled into place on the crown of a roadway and will weld together to give a dense impermeable, malleable surfacing which is self-repairing when rutted or dented. This embodiment, however, is not claimed in the present application but forms the subject matter of a separate application (Serial No. 162,509).

In the accompanying illustration we have shown more or less diagrammatically, an organization of apparatus elements susceptible of use in the performance of the stated process. In this showing the figure is a central longitudinal section.

Element 1 is a stationary heating casing which may be provided with burner 2, stack 3 and outlet doors 4 latched at 4'. Mounted within the stationary casing is a rotary drum 5, provided with internal mixing flanges 6 having manholes 7 on one side. The ends of the drum are carried by tubular members 8 and 9 suitably mounted respectively in bearings 10 and 11. These tubular members are closed respectively by sealing members 12 and 13. Passing through the former is stationary pipe 13' packed at 14. This pipe is valved and communicates through a T-connection with vacuum line 15 communicating with any suitable source of vacuum and steam line 16 communicating with any source of steam under pressure. At the other end of the drum is valved pipe 17 passing through the sealing member packed therein at 18. This pipe is stationary and has a downward prolongation 19 reaching to the bottom of the rotary drum.

At the top the stationary casing is provided with an inlet man hole 20. Rotation of the drum may be afforded by pulley 21.

In the use of this structure the rotary drum is turned up until man hole 7 is opposite 20 and a charge of rock, etc., placed in the drum. Man hole 7 and man hole 20 are now closed and the drum placed in rotation through 21, heat being afforded by burner 2 and suction through vacuum line 15. When the air and such steam as may be formed by heating the damp material are substantially exhausted, hot asphalt is sent in through 17. The rock or material is tumbled around in the presence of the asphalt by flanges 6. Rotation is continued until a substantial degree of absorption is obtained. The vacuum being released, high pressure steam is allowed to enter through 16 which forces the asphalt into the pores of the material. Rotation may be continued under pressure for as long as may seem desirable. At the end of this time the excess of asphalt is blown out through 17, the material being allowed to drain while stationary for some time. By now allowing man hole 7 to register with 4 and opening the man hole the charge of hot material drops out and may be used wherever desired.

By the word "limestone" as hereinbefore used we of course mean to include all the varieties of limestone, including dolomite, marl, etc., as well as similar calcareous materials, such as shells, shell marls, etc. The use of the stated method of impregnation is particularly advantageous with shells and many other very highly pervious forms of calcareous materials. Oyster shells and the like impregnate very thoroughly and evenly and are converted from a friable dust yielding material to one of considerable strength and very well adapted for road building. Under traffic the shells smash down to form a very dense, uniform road surface but of course do not yield dust or mud. Shell marls may be used in the same manner as shells. In addition to the calcareous materials which may be included under the term limestone we may of course use any other rocky material which is porous or pervious. As stated, most rocks coming from the crusher if not naturally porous are still pervious because of cracks and fissures.

Our invention may also be applied to the manufacture of pavements from ordinary soils and earth, since the described alternating vacuum pressure treatment offers a ready and efficient method of securing complete impregnation of dry porous materials even if rather cloddy. In treating earthy materials, however, we ordinarily break it up rather fine. Clayey soils, and particularly what are known as "gumbo" soils are often baked, burned or fritted to make road materials; and these products are well adapted for our purposes.

As the asphaltic material, we may use any of the commercial types of asphalt whether of high penetration or low penetration. The natural asphalts and the artificial asphalts such as those obtained by blowing petroleum oils may also be used. Natural liquid asphalts, such as those yielded by certain Mexican oils and Trinidad oils, are also applicable. Indeed if the present method is to be used merely for waterproofing rocky fragments to form the aggregate of a concrete, the fragments may be waterproofed with petroleum oils or materials with adhesive and waterproof qualities which are not asphaltic, such as still bottoms, residua, etc. Where stony fragments of limestone or the like occur in the soil the whole soil may be treated in the present manner, with or without a crushing, to reduce such fragments to a uniform maximum size. In so doing the stony fragments are impregnated as before while the earthy matter is also impregnated and forms a binder of the type of that previously described.

What we claim is:—

1. In the manufacture of composite articles the process which comprises waterproofing coarse mineral matter and forming a concrete therefrom with a matrix comprising a binder and fine mineral particles.

2. In the manufacture of composite articles the process which comprises waterproofing coarse crushed limestone and forming a concrete therefrom with a matrix comprising a binder and fine mineral particles.

3. In the manufacture of composite articles the process which comprises exposing coarse porous mineral matter to a vacuum to remove air, covering with liquid asphalt and producing pressure to force the asphalt into the pores and mixing with a matrix comprising a binder and fine mineral particles.

4. In the manufacture of composite articles the process which comprises exposing coarse porous limestone fragments to a vacuum to remove air, covering with liquid asphalt, producing pressure to force the asphalt into the pores and mixing with a matrix comprising a binder and fine mineral particles.

5. In the manufacture of composite articles the process which comprises placing paving material in a suitable container, heating, producing a vacuum in the container to remove air and moisture, contacting the material with liquid asphalt, producing pressure to drive the asphalt into the pores of the material and mixing with a matrix comprising a binder and fine mineral particles.

6. In the manufacture of composite articles the process which comprises placing paving material in a suitable container, heating, producing a vacuum to remove water and air, contacting the material with liquid asphalt, driving such asphalt into the pores of the material by producing a pressure of steam higher than atmospheric and mixing with a matrix comprising a binder and fine mineral particles.

7. In the manufacture of composite articles the process which comprises crushing a rock to produce run of crusher material, placing such run of crusher material in a suitable container, heating, producing a vacuum to remove air and moisture, contacting the material with liquid asphalt and driving such liquid asphalt into the pores of the material by pressure.

8. In the manufacture of composite articles the process which comprises crushing a limestone rock to produce run of crusher material, placing such run of crusher material in a suitable container, heating, producing a vacuum to remove air and moisture, contacting the material with liquid asphalt and driving such liquid asphalt into the pores of the material by pressure.

9. In the manufacture of composite articles the process which comprises crushing a limestone rock to produce comminuted material of various sizes, placing such comminuted material in a suitable container, heating, producing a vacuum to remove air and moisture, contacting the material with liquid asphalt and driving such liquid asphalt into the pores of the material by pressure.

10. In the manufacture of composite articles the process which comprises placing paving material in a suitable container, heating, producing a vacuum in the container to remove air and moisture, agitating the material with liquid asphalt and producing pressure to drive the asphalt into the pores of the material.

11. In the manufacture of composite articles the process which comprises placing paving material in a suitable rotatable air tight container, rotating and heating, producing a vacuum in the container to remove air and moisture, contacting the material with liquid asphalt while rotating the container, agitating the material with liquid asphalt and producing pressure to drive the asphalt into the pores of the material.

12. As a new structural material, a composite concrete containing fragments of waterproof mineral matter having their pores filled and sealed by asphalt.

13. As a new structural material a composite concrete containing fragments of waterproof limestone having their pores filled and sealed by asphalt.

14. An article composed of run of crusher rock fragments waterproofed by an asphalt impregnation, the coarser rock fragments forming an aggregate in a matrix of finer rock fragments of the same character.

15. An article composed of limestone rock fragments waterproofed by an asphalt impregnation, the coarser rock fragments forming an aggregate in a matrix of finer rock fragments of the same character.

16. As a new paving material a hard, dense composition containing comminuted limestone particles, such particles having the character of shattered rock fragments and each such particle being impregnated with a waterproofing asphalt impregnation.

17. The herein described method of waterproofing soil and finely divided mineral matter, which consists in introducing the material to be treated into a container, subjecting the same to heat for raising the temperature thereof, then subjecting the contents of the container to vacuum action, whereby to expand the material under the heat to render the same more susceptible to penetration by the waterproofing agent, adding a waterproofing and binding agent to the material, and finally applying pressure to force the waterproofing and binding agent into the material.

18. The herein described method of waterproofing soil and finely divided mineral matter, which consists in introducing the material to be treated into a container, subjecting the same to heat for raising the temperature thereof, then subjecting the contents of the container to vacuum action, whereby to expand the material under the heat to render the same more susceptible to penetration by the waterproofing agent, adding a bituminous substance to the material capable of waterproofing the latter and also to serve as a binder therefor, and finally applying pressure to force the bituminous substance into the material.

19. The herein described method of waterproofing soil and finely divided mineral matter, which consists in introducing the material to be treated into a container, raising the temperature thereof, effecting a simultaneous removal of moisture from the material and expansion of the latter under its raised temperature by subjecting the contents of the container to vacuum action, whereby to render the material more susceptible to penetration by the waterproofing agent, adding to said material a waterproofing agent, and finally applying pressure to force the waterproofing agent into the material under treatment.

20. The herein described method of waterproofing soil and finely divided mineral matter, which consists in raising the temperature of the material to be treated, subjecting the same while in its heated condition to vacuum action, whereby to expand the material under its heat and render the same more susceptible to penetration by the waterproofing agent, introducing into the material an agent capable of waterproofing the same, and then applying pressure to the material and said waterproofing agent to force the latter into said material.

In testimony whereof we affix our signatures hereto.

March 14, 1917.

MICHAEL A. POPKESS.

March 16, 1917.

JAMES EDGAR BLACK.

It is hereby certified that Letters Patent No. 1,334,317, granted March 23, 1920, upon the application of Michael A. Popkess and James Edgar Black, of Kansas City, Missouri, for an improvement in "Composite Articles and Processes of Making Same," were erroneously issued to the inventors, said Popkess and Black, whereas said Letters Patent should have been issued to *Bituminized Road Company, of Kansas City, Missouri, a corporation of Arizona*, as assignee of the entire interest in said invention, as shown by the records of assignments in this office; and that the said Letters Patent should be read with this correction therein that the same may conform to the record of the case in the Patent Office.

Signed and sealed this 13th day of April, A. D., 1920.

[SEAL.]

M. H. COULSTON,
*Acting Commissioner of Patents.*

Cl. 106—31.